March 31, 1970  A. E. JOSLIN  3,503,244
PIPE HOLDING MECHANISM
Filed May 29, 1967  2 Sheets-Sheet 1
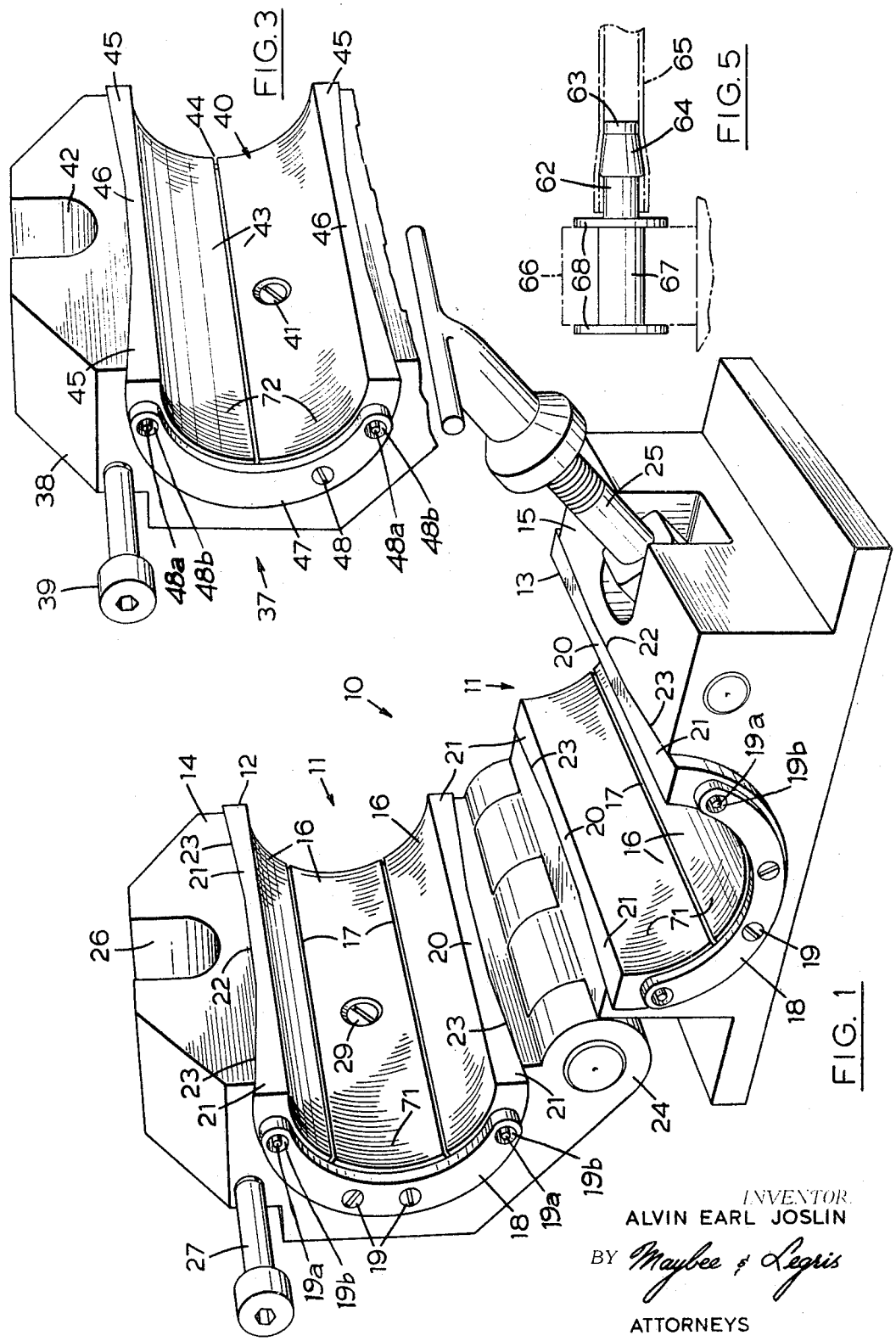
INVENTOR
ALVIN EARL JOSLIN
BY Maybee & Legris
ATTORNEYS March 31, 1970   A. E. JOSLIN   3,503,244

PIPE HOLDING MECHANISM

Filed May 29, 1967   2 Sheets-Sheet 2

INVENTOR.
ALVIN EARL JOSLIN
BY *Maybee & Legris*
ATTORNEYS

· # United States Patent Office 3,503,244
Patented Mar. 31, 1970

3,503,244
PIPE HOLDING MECHANISM
Alvin Earl Joslin, 1559 Elite Drive,
Clarkson, Ontario, Canada
Filed May 29, 1967, Ser. No. 642,126
Int. Cl. B21d *41/02*
U.S. Cl. 72—317     11 Claims

ABSTRACT OF THE DISCLOSURE

A pipe holding mechanism having a collet portion split into two halves, each half being slidably mounted in a mouting block and having at least two spaced apart lengthwise segments. The mounting blocks are securely but releasably attached together so that the collet halves from a uniform pipe-receiving inner cylinder and each collet half has a middle portion of uniform thickness and uniformly diverges in thickness towards each end. A pipe clamped in the device when pulled in either direction is gripped increasingly strongly as the pulling intensity increases.

BACKGROUND OF THE INVENTION

In forming and malforming operations performed on circular pipes wherein intensive forces are brought to bear on the pipe there has always been the problem of providing adequate holding devices for the pipes which will retain them in the required position despite the intensity of the forces used in the operations being performed on the pipes. Sometimes the pipe holding device performs its function well but leaves undesirable markings on the pipe or even leaves some distortion therein.

A particular example of a pipe operation in which intense forces are brought to bear lengthwise on pipes and in which firm retention of the pipe in position is necessary is the pipe joining method and joint resulting therefrom described in U.S. Patents Nos. 3,208,136 and 3,210,102, granted to the present inventor. The pipe joint described in these patents, which uses no extra joining section, has been found to be substantially free from mechanical failures and provides a leak-proof pressure seal. The pushing of two pipe ends together to form this joint requires, however, the use of considerable force, as does the initial step in expanding one of the pipe ends. Thus, a force of the order of 13 tons is required to press together the end sections of 1¼″ I.D. pipe of schedule 40 Grade B steel in making a joint as described in these patents. The need of a pipe holding mechanism, for operations such as the afore-described, which operates more effectively and quickly than prior art pipe holding devices while at the same time avoiding undesirable marking or distortion, has been a pressing need in the art.

SUMMARY

In accordance with the invention a novel pipe holding mechanism has been discovered which effectively and efficiently holds a pipe, while substantially avoiding marking and distortion thereof, with a force which increases in magnitude as the forces acting on the pipe increase. The mechanism has a collet portion, with a cylindrical pipe receiving inner surface, which is split into completely separable halves, and two mounting blocks, one for the reception and mounting of each collet half. The collet halves are mounted in the blocks so as to be slidable lengthwise in either direction therein and each half has at least two lengthwise segments arranged in spaced relationship and held together with connecting pieces at each end thereof. Each segment, and as a result each collet half, has a middle portion having substantially uniform wall thickness with the middle portion being subtended at each end thereof by end portions whose walls uniformly and gradually diverge in thickness to the ends of the segments. The outer surfaces of these end portions with the collet halves placed together thus are in the shape of truncated cones. The mounting blocks on which the collet halves slide have inner contours which match and receive the outer surfaces of the segments and the collet halves made up therefrom. In operation the mounting blocks can be securely connected together to thus bring the collet halves together and form a uniform, inner pipe receiving cylinder therefrom.

When a pipe is securely clamped between the mounting blocks and gripped within the collet halves and a longitudinal force is applied to the pipe by pushing or pulling, the gripping intensity of the pipe holding mechanism increases as the pushing or pulling force increases.

It is an object of the present invention to provide a novel pipe holding mechanism which effectively holds a pipe in a required position under the reaction of intense forces applied longitudinally against the pipe, without marking or distorting the pipe.

Other objects and advantages of the invention will be apparent from the description of the preferred embodiments following, described in conjunction with the accompanying drawing.

BRIEF DESCRIPTION OF THE DRAWING

FIG. 1 is a perspective view of a pipe holding mechanism embodying the present invention, shown in open position;

FIG. 3 is a perspective view of a broken-away portion of a variation of the embodiment shown in FIG. 1;

FIG. 5 is an elevational view of a pipe expanding tool used with the pipe holding device of the invention.

DESCRIPTION OF THE PREFERRED EMBODIMENTS

Figure 4:
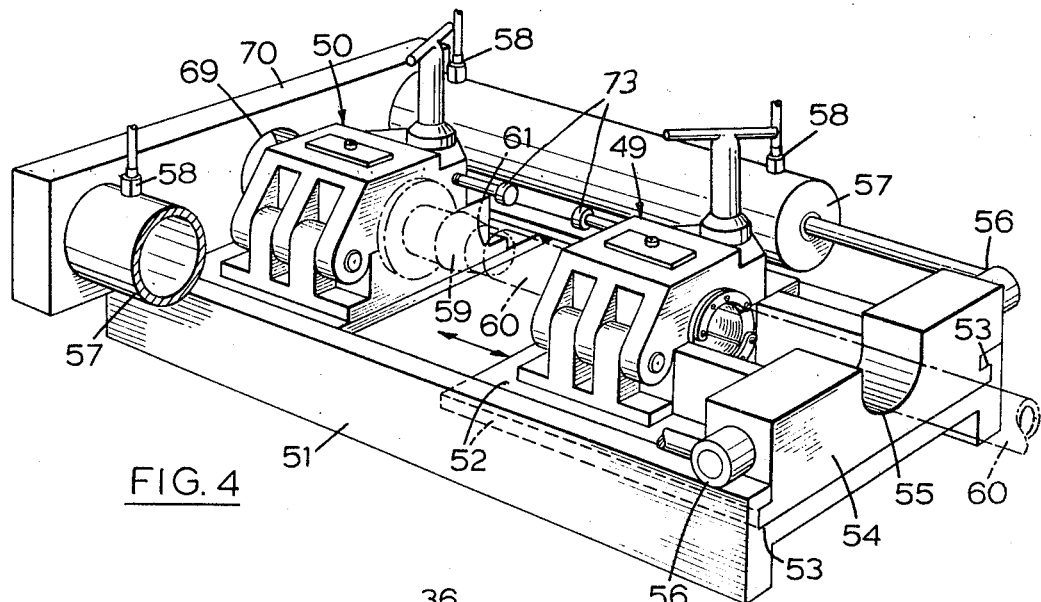
FIG. 4 is a perspective view of an arrangement utilizing several pipe holding mechanisms embodying the invention.

A perspective view of a preferred form of pipe holding mechanism 10 embodying the invention is shown in FIG. 1. The pipe holder 10 is shown in the open position ready to receive a pipe on which working operations would be carried out. The pipe holder 10 has a pipe-receiving inner collet portion 11 which is separated into two substantially identical halves 12, 13. The halves 12, 13 together make up the collet portion 11, having a cylindrical inner surface, when the pipe holder 10 is in the closed position. The collet halves 12, 13 are mounted to move slidably longitudinally in either direction in mounting blocks 14, 15 respectively and each collet half is composed of a number of separate lengthwise segments 16 arranged in spaced relationship with narrow spaces 17 therebetween. The segments 16 are held together, advantageously at each end thereof, such as by arc-shaped connecting pieces 18 (shown only at one end), attached to the inner segment by machine screws 19. In the embodiment shown in FIG. 1 each of the collet halves 12, 13 is seen to have three lengthwise segments. The collet segments 16 must be free to move radially in performing a clamping action on a pipe being worked on and this is accomplished by having the outer segments of the collet half retained by pins 19a attached thereto and loosely fitted in holes 19b on the connecting piece 18.

Each of the segments 16 is seen to have a portion 20 at the middle thereof with substantially uniform wall thickness therealong and the middle portions 20 are subtended at each end thereof by end portions 21, the walls of which are seen to substantially uniformly and gradually diverge in thickness substantially to the ends of the segments 16. With the pipe holder 10 in closed position the combined outer surfaces of the end portions 21 are in the shape of a truncated cone. The mounting blocks 14, 15 which receive the collet halves 12, 13, and in which the collet halves reciprocally slide, have inner surfaces with contours matching the outer surfaces of the segments 16 of the collet halves. Thus, the mounting blocks 14, 15 have inner middle surfaces 22 matching the outer surfaces of the middle portions 20 of the collet segments 16 and diverging inner end surfaces 23 matching the outer surfaces of the end portions 21 of the collet segments.

The mounting blocks 14, 15 are securely connectible together so as to bring the collet halves 12, 13, together to form a uniform, pipe-receiving cylinder therefrom. Advantageously the blocks 14, 15 are clamped securely together and this is best accomplished by connecting them together by way of hinges 24 on one side thereof. The blocks and contained collet halves can then be swung together and, at the same time, are always connected by way of the hinges 24. The other side of the mounting blocks 14, 15 opposite the hinge means 24 have clamping means associated therewith, shown in FIG. 1 as consisting of an adjustable clamp arm 25 rotatably mounted in block 15 and a clamp receiving slot 26 in block 14. When the pipe holder has a pipe inserted therein and is closed the adjustable clamp arm 25 is swung into the slot 26 and is tightened down on the block 14 so as to securely clamp the blocks 14, 15 together and grip the pipe securely in the collet portion 11. A gripping handle 27 is advantageously located on the mounting block 14 to assist in closing or opening the pipe holder 10.

In order to provide an integral mechanism so as to avoid separation or loss of parts it is advantageous that the collet halves 12, 13 be slidably attached to the mounting blocks 14, 15 while still allowing the collet to move in the blocks in either direction along the cylindrical axis of the pipe receiving cylinder formed by the inner surface of the collet. This is advantageously carried out by the arrangement shown in FIG. 2 which is a perspective view of the pipe holder of FIG. 1 in closed position. Attachment means 28 for the collet half 12 in the mounting block 14 is depicted in an exploded view thereof. A retaining screw 29 (shown also in FIG. 1) is run through the middle one of the segments 16 in the collet half 12 and through the mounting block 14 from the inside of the collet segment to the outside of the mounting block. The screw 29 is attached to a screw receiving block 30 suitably threaded therefor, which is slidably mounted on the outside of the block 14. The screw 29 passes through a longitudinal slot 31 which runs completely through the block 14 and in which the screw 29 can reciprocally move as the collet slides reciprocally in the mounting blocks 14, 15.

It is preferable to provide some sort of centering mechanism for the collet halves 12, 13 so that before a pipe is inserted in the pipe holder 10 and before the pipe holder is closed the collet halves will be properly centered on the matching surfaces 22, 23 (see FIG. 1) of the mounting blocks 14, 15. This is accomplished by providing a slotted depression 32 in the block 14 in which the screw receiving block 30 slides. The block 30 is biased to hold the collet half 12 centered and in proper position in the mounting block 14 by compressed springs 33 acting against each end thereof and seated in retaining holes 34 in the slotted depression 32. Advantageously, a sliding cover plate 35 is located over the slotted depression 32 to prevent dirt from accumulating therein, the plate 35 being attached to the sliding block 30 by way of screw 36.

A slidable attachment is, of course, advantageously provided for the collet half 13, the same as that provided for the collet half 12, to attach it to the mounting block 15. Thus, a completely integral pipe holding device is provided which can be quickly operated without wasting time in assembling and positioning parts therefor.

Figure 2:
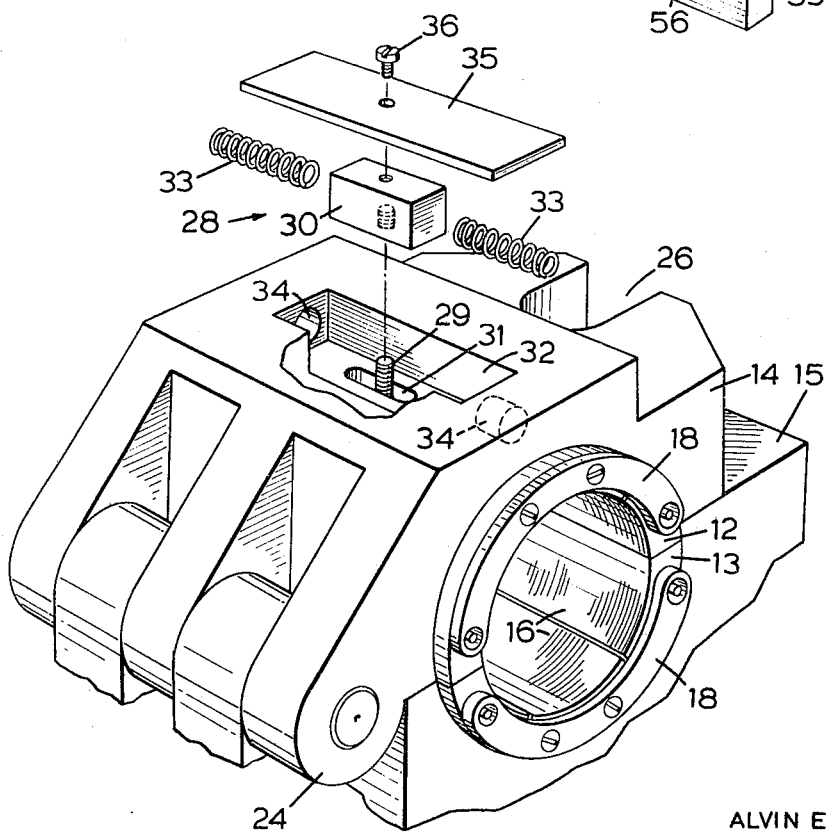
FIG. 2 is a perspective view of the pipe holding mechanism of FIG. 1 in the closed position and shown in a partly exploded view thereof.

Although the pipe holding mechanism has been described in conjunction with FIGS. 1 and 2 as having three segments in each collet half, it is found that the pipe holding mechanism will operate with two segments in each collet half as shown in FIG. 3 of the drawings, which is a perspective, broken-away view of half of a pipe holder 37, embodying the invention. Thus, a mounting block 38, having a grasping handle 39 attached thereto, is shown with a collet half 40 slidably attached thereto by way of attaching screw 41. A clamp receiving slot 42 is shown for receipt of a clamping device attached to the other half of the pipe holder 37 (not shown). The collet half 40 is split into two separate longitudinal segments 43 having a narrow space 44 therebetween and having diverging end sections 45 and a straight middle section 46 therein, as before, and the segments 43 are held together at the ends thereof by way of arc shaped connecting pieces 47 (one only being shown at one end in FIG. 3) and machine screws 48 (one only being shown in the visible connecting piece 47). Pins 48a on the segments 43 are shown loosely fitted in holes 48b in the outer ends of the connecting piece 47. The collet attaching screw 41 is seen to be retained in one of the segments 43 of the collet half 40. The arrangement for the other half of the pipe holder 37 (not shown) is the same as that shown in FIG. 3.

Although the two segment collet half arrangement shown in FIG. 3 provides a useful pipe holding mechanism, it is found that the arrangement shown in FIGS. 1 and 2, using a three segment collet half, provides a more effective gripping mechanism with less marking of a pipe resulting therefrom. More than three segments can be used with advantage in each collet half with possibly an even smoother grip on pipes being attained therewith. It is to be noted that the angle of divergence for the end portions of the collet segments is preferably between about 5° and about 7° to provide the most advantageous gripping effect. Thus, the collet segments should preferably diverge towards their ends at an angle of between about 5° and 7° from the horizontal centre line of the pipe-receiving cylinder.

In operation, the pipe holding mechanism 10 (referring to FIGS. 1 and 2) has a pipe placed on one collet half 13 and the pipe holder is then closed (as shown in FIG. 2) and clamped tightly over the pipe, with both collet halves 12 and 13 being in gripping contact therewith, the clamp 25 being tightened in the slot 26 down onto the mounting block 14. A working operation exerting longitudinal forces on the pipe is then commenced and as the pipe is pushed or pulled longitudinally in one direction it carries the slidable collet 11 with it. This action causes the diverging end portions 21 at one end of the collet 11 to ride up on the middle inner surfaces 22 of the mounting blocks 14, 15 and the end portions 21 are forced inwardly to more strongly grip the pipe within the collet with an intense wedging action. As the longitudinal force on the pipe increases and it and the collet 11, are moved further along through the mounting blocks the end portions 21 of one end of the collet 11 ride further up on the middle inner surfaces 22 of the mounting blocks and the wedging action and grip on the pipe increases even more in intensity. It can be seen, then, that the gripping force on the pipe is increased as the pushing or pulling forces along the pipe increase in magnitude. When a tool working on the pipe has then to be released therefrom the longitudinal force on the pipe reverses direction and the pipe and collet slide in the mounting blocks in the other direction. The diverging end portions 21 at the other end of the collet then ride upon the inner surfaces 22 of the blocks 14, 15 and a wedging action of these end portions 21 on the pipe again results, thus allowing a working tool to be pulled or pushed off a pipe despite the intensity of longitudinal force required therefor.

The pipe holding mechanism 10 must, of course, be securely mounted before a pipe can be properly gripped therein and FIG. 4 shows a perspective view of two pipe holders embodying the invention mounted in an arrangement which can be utilized for expanding or belling the ends of pipes such as is required in the joining method and joint resulting therefrom described in U.S. Patent Nos. 3,208,136 and 3,310,112 of the present inventor.

Referring to FIG. 4, two pipe holders 49, 50, having the same structure as that shown in and described with reference to FIGS. 1 and 2, are shown mounted on a supporting structure 51. The pipe holder 49 is integrally attached to a sliding plate 52 which slides in grooves 53 in the supporting structure 51. Integral with the plate 52 is block 54 with a groove 55 located in the middle thereof. The block 54 has arms 56 attached thereto which in turn are attached to reciprocal power means, such as hydraulic cylinders 57 containing hydraulically, reciprocally driven pistons attached to the arms 56. Hydraulic fluid is supplied under pressure to either ends of the cylinders 57 through lines 58 from a suitable source (not shown). The sliding plate 52, then, can be moved in either direction in the supporting structure 51.

The other pipe holder 50 is integrally attached to the supporting structure 51 and arranged so that the inner pipe-receiving cylinders of both the pipe holders 49, 50 are aligned. As afore-mentioned the arrangement of FIG. 4 is used for expanding or belling the ends of pipe and a pipe-expanding tool 59 is shown in broken outline clamped in the pipe holder 50 with its centre line aligned with the centre line of the pipe-receiving cylinder of the pipe holder 49. At the same time a pipe 60 is shown in broken outline resting in the groove 55 and securely clamped in the pipe holder 49 with end 61 resting against and aligned with the end of the expanding tool 59. The power cylinders 57 are operated to slide the pipe holder 49 and the contained pipe 60 towards the pipe expanding tool 59 with the end 61 of the pipe 60 then being expanded or belled by the tool 59. As the longitudinal force exerted by the tool 59 on the pipe 60 builds up, the grip on the pipe by the pipe holder 49 increases in intensity, as explained hereinbefore. The grip on the pipe is such that there is no difficulty in maintaining a smooth, non-slip grip on the pipe with substantially no marking of the pipe resulting therefrom.

Referring to FIG. 5, a form of pipe expanding tool 62 is depicted, advantageously used with the arrangement shown in FIG. 4. The circular tool 62 has a small end 63 for initial insertion into a pipe end to be expanded and a bell shaped portion 64 which carries out the expanding action. A broken-away portion of a pipe 65 which has been expanded at its end by the tool 62 is shown in broken outline located over the tool. The tool is shown located in a clamping device 66 (depicted in broken outline) such as pipe holder 50 shown in FIG. 4. The clamping device 66 is located on portion 67 of the tool 62 with holding collars 68 on the tool located at either side of the clamping device 66. It is found that a taper on the bell portion 64 of not more than 4° from the longitudinal centre line of the tool 62 is necessary to effectively expand pipe ends as described herein.

Referring again to FIG. 4, when the pipe 60 has had its end 61 expanded as desired, the power cylinders 57 are operated to reverse the direction of the pipe holder 49 and the contained pipe 60 to pull the pipe off the expanding tool 59. In this stage of the operation the pipe holer 49 grips the pipe 60 in the other direction as described hereinbefore to resist the pull of the tool 59. Again, this grip increases in intensity as the force of the pull on the pipe increases in intensity and the pipe is easily pulled off the expanding tool while maintaining a smooth, non-slip grip on the pipe and substantially avoiding marking thereof. Although the pipe 60 is shown in FIG. 4 as located in the movable pipe holder 49, with the expanding tool 59 in the stationary pipe holder 50, the locations of the pipe 60 and the expanding tool 59 can be reversed for the sake of convenience, with the pipe gripped in the stationary pipe holder 50 and located, in the arrangement shown in FIG. 4, through hole 69 in supporting structure 70 for the power cylinders 57 and the pipe expanding tool located in the movable pipe holder 49. In such case the expanding tool would be moved into the stationary pipe and then withdrawn therefrom.

The arrangement shown in FIG. 4 is also most useful for gripping and telescoping together pipe ends to form the coupling described in U.S. Patent Nos. 3,208,136 and 3,210,102, aforementioned. Thus, an end of one pipe is first grooved and the end of another pipe to be joined thereto is expanded or belled (using the arrangement of FIG. 4 as described herein) and the two pipes are gripped in the pipe holders 49, 50 and are then telescoped together, with a proper sealant being used therebetween, the pipe holder 49 being moved toward the pipe holder 50 until the coupling is complete. The intense longitudinal forces required to complete the coupling are successfully resisted by the pipe holders 49, 50, while retaining a non-slip grip on the pipes.

It is to be noted that a firmer, non-slip grip is provided by the inner surfaces of the collet portions of the pipe holder if these surfaces are scored to provide a rough surface. Thus scoring 71, 72 is shown on the inner surfaces of the collet segments 16, 43, respectively, in the embodiments shown in FIG. 1 and FIG. 3. It is to be noted also that the handles 27, 39 shown in FIG. 1 and FIG. 3 can serve a dual purpose as limit stops, such as in the arrangement shown in FIG. 4. Thus, handles 73 are shown on the pipe holders 49, 50 where they act as limit stops to determine the length of stroke of the power cylinders 57. The handles 73 are adjustable inwardly and outwardly from the pipe holders 49, 50 to vary the length of stroke.

What I claim as my invention is:

1. A pipe holding mechanism comprising a collet portion with a cylindrical pipe receiving inner surface having two separable halves and two mounting blocks, one for receipt and mounting of each collet half, said collet halves being mounted slidably in either direction in said mounting blocks, each said collet half having at least two lengthwise segments arranged in spaced relationship and held together with connecting pieces, each said segment having a portion at the middle thereof with substantially uniform wall thickness, the middle portion being subtended by end portions the walls of which substantially uniformly and gradually diverge in thickness to the ends thereof, each said end portion making a combined outer surface in the shape of a truncated cone with the pipe holding mechanism in closed position, the mounting blocks on which each collet half slides having inner contours to match and receive the outer surfaces of the segments of the collet halves and the said two mounting blocks receiving the collet halves being securely connectible together to bring the collet halves together to form a uniform, inner pipe-receiving cylinder therefrom.

2. A pipe holding mechanism as claimed in claim 1 wherein each collet half has at least three lengthwise segments therein.

3. A pipe holding mechanism as claimed in claim 2 wherein the end portions of the segments diverge in thickness at an angle of between about 5° and about 7° to the horizontal centre line of the pipe-receiving cylinder.

4. A pipe holding mechanism as claimed in claim 3 wherein the two mounting blocks are hingedly connected together on one side thereof by hinge means to allow the collet halves to be swung together and said two mounting blocks have clamping means on the other side thereof opposite the hinge means to allow the secure clamping together of the blocks and the collet halves contained therein.

5. A pipe holding mechanism as claimed in claim 3 wherein the collet halves are slidably attached to the mounting blocks to move in either direction along the axial direction of the pipe-receiving cylinder.

6. A pipe holding mechanism as claimed in claim 4 wherein the collet halves are slidably attached to the mounting blocks to move in either direction along the axial direction of the pipe-receiving cylinder.

7. A pipe holding mechanism as claimed in claim 6 wherein the attachment of each collet half to a mounting block is by a retaining screw running through the collet half and the mounting block from the inside of one collet segment to the outside of the mounting block, said screw being attached to a screw receiving block slidably mounted in the outside of the mounting block and said mounting block having a slot therethrough through which said retaining screw passes.

8. A pipe holding mechanism as claimed in claim 7 wherein the mounting block has a slotted depression on the outside thereof and the screw receiving block is located slidably therein and is biased to hold the collet half centred in the mounting block by way of two compressed springs located in the slotted depression, one at each end of the screw receiving block.

9. A pipe holding mechanism as claimed in claim 6 which is slidably mounted on a support means, said support means having a pipe expanding tool also mounted thereon, the centre line of the pipe expanding tool being aligned with the centre line of the inner pipe-receiving cylinder of the collet portion of the pipe holding mechanism, the pipe holding mechanism being slidable towards and away from the pipe expanding tool, and said pipe holding mechanism being attached to a power means which reciprocally slidably moves the pipe holding mechanism.

10. A pipe holding mechanism as claimed in claim 6 which is slidably mounted on a support means, said support means having a second pipe holding mechanism integrally and immovably attached thereto, said second pipe holding mechanism being a duplication of said slidably mounted pipe holding mechanism, the centre lines of the pipe receiving cylinders of the two pipe holding mechanisms being aligned, the slidably mounted mechanism being slidable towards and away from the immovable mechanism, and said slidably mounted mechanism being attached to a power means which reciprocally slidably moves the slidable mechanism.

11. A pipe holding mechanism as claimed in claim 10 wherein a pipe expanding tool is clamped in one of the pipe holding mechanisms, the tool being aligned with the pipe receiving cylinder of the other pipe holding mechanism.

References Cited
UNITED STATES PATENTS

| | | | |
|---|---|---|---|
| 818,337 | 4/1906 | Barnes | 72—316 |
| 2,675,050 | 4/1954 | Downing | 72—316 X |
| 2,757,523 | 8/1956 | Schmid | 279—55 X |

FOREIGN PATENTS

| | | |
|---|---|---|
| 150,955 | 9/1920 | Great Britain. |

MILTON S. MEHR, Primary Examiner

U.S. Cl. X.R.

24—249, 263; 279—55